United States Patent [19]

Hemp et al.

[11] 4,434,666
[45] Mar. 6, 1984

[54] ELECTROMAGNETIC FLOWMETERS AND METHODS FOR MEASURING FLOW

[75] Inventors: John Hemp, Cranfield, England; Yousif A. H. Al-Khazraji, Baghdad, Iraq

[73] Assignee: National Research Development Corporation, London, England

[21] Appl. No.: 137,463

[22] Filed: Apr. 4, 1980

[30] Foreign Application Priority Data

Apr. 5, 1979 [GB] United Kingdom ............... 7911895

[51] Int. Cl.$^3$ ........................................... G01F 1/58
[52] U.S. Cl. ................................................ 73/861.12
[58] Field of Search .......... 73/862.12, 862.14, 861.16, 73/861.17

[56] References Cited

U.S. PATENT DOCUMENTS

| 2,733,604 | 2/1956 | Coulter ........................... 73/861.12 |
| 3,566,686 | 3/1971 | Cushing . |
| 3,589,186 | 6/1971 | Bourg et al. ..................... 73/861.16 |
| 3,759,097 | 9/1973 | Cushing . |
| 3,999,443 | 12/1976 | Appel et al. ..................... 73/861.17 |
| 4,050,303 | 9/1977 | Hemp et al. . |
| 4,098,118 | 7/1978 | Schmoock ........................ 73/861.12 |
| 4,308,752 | 1/1982 | Appel et al. ..................... 73/861.12 |

FOREIGN PATENT DOCUMENTS

| 1043594 | 9/1966 | United Kingdom . |
| 1130368 | 10/1968 | United Kingdom . |
| 1190045 | 4/1970 | United Kingdom . |
| 1275137 | 5/1972 | United Kingdom . |
| 1502860 | 8/1978 | United Kingdom . |
| 1539908 | 2/1979 | United Kingdom . |
| 2014740 | 8/1979 | United Kingdom . |
| 1551007 | 8/1979 | United Kingdom . |

OTHER PUBLICATIONS

"The Theory of Induced Voltage Electromagnetic Flowmeters", 1970 Journal Fluid Mech., vol. 43, Part 3, pp. 577-590.
"Long Induced Voltage Electromagnetic Flowmeters and the Effect of Velocity Profile", Bevir, Quart. Journ. of Mech. and Applied Math, vol. XX, Part 3, 1971, pp. 347-372.
"Electromagnetic Flowmeters", Baker Lecture 13A in 1977, Course Entitled The Principles and Practice of Flow Measurement.
"Improved Magnetic Field for an Electromagnetic Flowmeter with Point Electrodes", Hemp, J. Phys. D: Appl. Phys., vol. 8, 1975, pp. 983-1002.

*Primary Examiner*—Charles A. Ruehl
*Attorney, Agent, or Firm*—Cushman, Darby & Cushman

[57] ABSTRACT

An electromagnetic flowmeter for measuring the mean velocity of a fluid flowing through a duct is described. In one embodiment the electrodes are shaped to provide a uniform weighting function relating fluid velocity distribution over the duct cross section to flowmeter output voltage representative of mean velocity. Flowmeters are described in which using large insulated electrodes sensitivity is made independent of velocity profile by either ensuring that the applied magnetic field is uniform and the virtual current in the duct is two dimensional, or vice versa.

18 Claims, 12 Drawing Figures

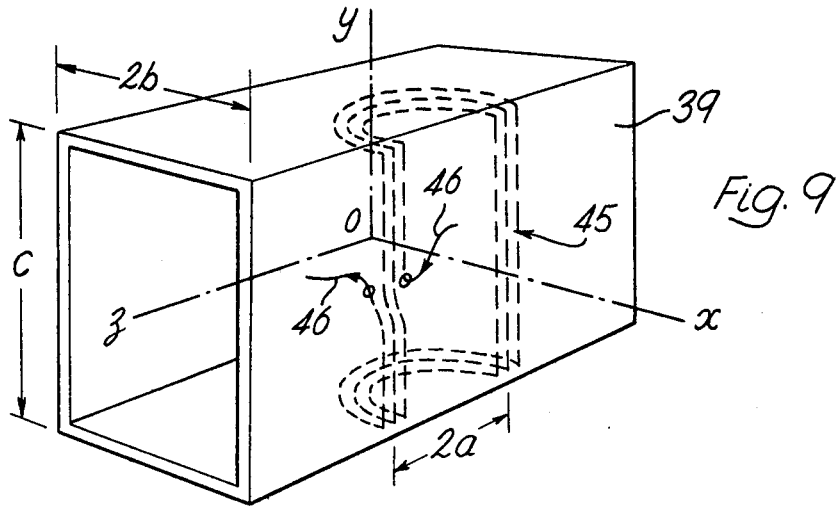
Fig. 9
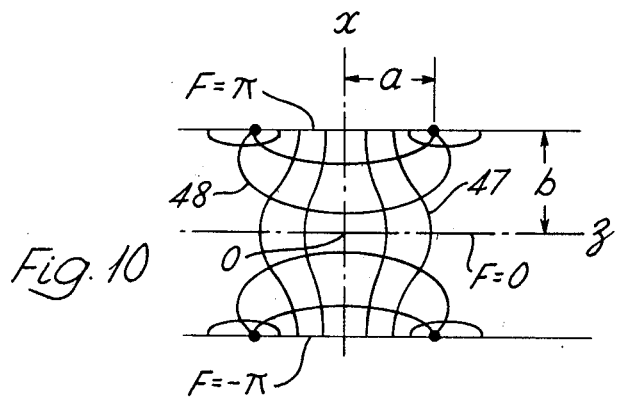
Fig. 10
Fig. 11
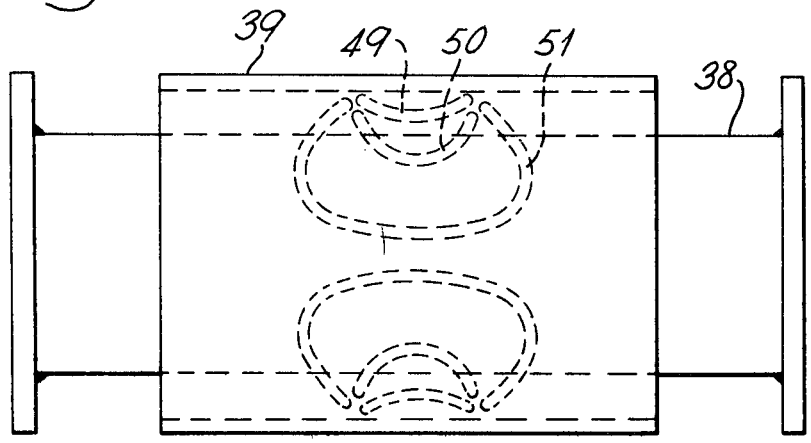

ELECTROMAGNETIC FLOWMETERS AND METHODS FOR MEASURING FLOW

The present invention relates to electromagnetic flowmeters primarily for moderately conducting liquids (that is liquids having conductivities in the range $10^{-5}$ to $10^5$ Mhos/meter), such as water.

In an electromagnetic flowmeter a magnetic field is applied across a duct containing a fluid, that is liquid or gas, normal to the flow of fluid. The resultant voltage generated in the liquid by virtue of its movement through the magnetic field is sensed by electrodes on opposite sides of the duct. For diametrically opposed point electrodes in a circular cylindrical duct the voltage obtained is proportional to the mean velocity in the duct providing the magnetic field is uniform and the velocity profile of the liquid in the duct is axisymmetric.

Inaccuracies therefore arise in electromagnetic flowmeters because the only magnetic field which is uniform is one from a magnet of infinite extent and because it is not always convenient to allow the necessary upstream duct length to ensure an axisymmetric velocity profile.

In "The theory of electromagnetic flow-measurement" by J. A. Shercliff, Cambridge University Press, 1962, which is the standard text on electromagnetic flow measurement, Shercliff suggested a way of predicting the effect of distorted velocity profiles in uniform magnetic field point electrode electromagnetic flowmeters using a weight function. The velocity at each point in the duct cross section is multiplied by a weight for that point which is given by the weight function.

In this specification a large electrode means an electrode having an appreciable area as compared with a point electrode. For example for a duct of circular cross-section an electrode subtending an angle of 30° at the duct axis and a length equal to a quarter of the duct diameter would be a large electrode.

According to a first aspect of the present invention there is provided a flowmeter comprising a duct for a fluid, means for applying a magnetic field to a fluid in the duct, the magnetic field having at least one component which is generally normal to the direction of fluid flow, and two large electrodes (as hereinbefore defined) insulated from fluid in the duct and so positioned opposite one another across the duct that a virtual current between the electrodes would have at least a component generally normal to both the direction of fluid flow and the magnetic field, the electrodes being constructed and/or arranged to tend to minimize the effect of fluid velocity profile in the duct on the voltage generated between the electrodes by fluid flow in the duct, and the flowmeter being such that in operation the said voltage substantially indicates the mean velocity of fluid flowing through the duct.

In this specification a virtual current in a fluid between two electrodes is the current density (a vector quantity) which would be set up in the fluid if unit current were passed into one electrode and removed from the other.

An advantage of the present invention is that by using large electrodes the weight function can be made less variable over the duct area and can by shaping the electrodes and/or adjusting the magnetic field be made to approach a constant over the whole duct area. However, a disadvantage of large electrodes is that they are subject to fouling and chemical attack which may vary over the electrode surface but this disadvantage is overcome in the present invention by insulating the electrodes from fluid in the duct.

The means for applying a magnetic field may comprise one or more premanent magnets and/or electromagnets, any such electromagnet or electromagnets being driven by a constant or time varying current, for example direct current, alternating current or pulsed current.

In one type of electromagnetic flowmeter suitable for rectilinear flow and having a circular cross-section duct, a magnetic system often used in commercial flowmeters and which comprises two large rectangular windings one on one side of the duct, one on the other and both with axes normal to the fluid flow, can be retained while the distance of the two large electrodes from the interior surface of the duct varies with polar co-ordinates $\theta$ to provide a substantially uniform weight function. Each of the two large electrodes is then formed generally as a segment of a conducting cylinder buried in insulating duct walls and subtending nearly 180° at the duct axis. The cylinder segment is, however, so modified by increasing the distance of the electrode from the duct axis with increasing angle from the electrode center that the weighting function is substantially uniform over the whole area of the duct; that is flow in each portion of the duct cross-section contributes substantially uniformly to the voltage which is indicative of mean fluid velocity. A line joining the centers of the gaps between adjacent ends of the electrodes is coincident with the axes of the coils.

A way in which the best electrode shape for any given magnetic field can be determined is given later.

While the weight function can be improved with an existing magnetic field to give flowmeters suitable for rectilinear flow having any velocity profile, ways will now be discussed for devising electromagnetic flowmeters according to the invention for all types of flow.

In the paper "The theory of induced voltage electromagnetic flowmeters" by M. K. Bevir, J Fluid Mech. (1970), Vol. 43, part 3, pages 577 to 590, the weighting function is said to depend on the magnetic field and the virtual current between the electrodes; that is the current which would flow if a voltage were applied across the electrodes. Bevir states that a flowmeter with sensitivity independent of velocity profile (an "ideal" flowmeter) is obtained if either the magnetic field is uniform and the virtual current lies in planes perpendicular thereto, or vice versa.

Thus in a first "ideal" type of flowmeter according to the invention the means for applying the magnetic field applies a uniform magnetic field (that is a magnetic field which is the same wherever it is measured within the flowmeter) and may comprise an open ended rectangular tube of magnetic material surrounding the duct and having a longitudinal axis which is coincident with that of the duct, and windings around opposite walls of the tube wound to provide magnetic fluxes in opposite senses in the tube walls. The electrodes are shaped and positioned to ensure that virtual current is "two-dimensional" (that is having components only in two dimensions but these components may vary with position) and does not have a component in the dimension parallel to the uniform magnetic field. For a rectangular duct in flowmeters of this first ideal type, the electrodes may each simply comprise a strip of conducting material insulated from the duct interior and positioned between a respective one of the windings and the duct, with the longitudinal axis of the strip normal to the direction of fluid flow. For a duct of circular cross-section, each electrode may be so shaped, in each cross-section, that the distance between each point on the interior surface of the duct and the electrode is inversely proportional to the normal component of a virtual current which is "two-dimensional" in the duct, for example the virtual current obtained in connection with the strip electrodes mentioned above for a rectangular duct. Along the length of the duct the distance between the interior surface of the duct and each electrode increases gradually away from the center of the electrode until the electrical coupling between fluid in the duct and the electrode is negligible where the electrode is terminated.

In a second type of "ideal" flowmeter according to the invention, the electrodes are shaped and positioned to provide uniform virtual current and the means for applying a magnetic field is constructed to apply a "two-dimensional" field with no component parallel to the uniform virtual current. For a duct of circular cross-section, each electrode may be shaped to conform with a constant potential surface in an imaginary arrangement in which the inner surface of the duct is replaced by a conducting cylinder placed in an initially uniform electric field normal to the cylinder axis. The means for applying the magnetic field may then comprise an open ended rectangular tube of magnetic material with longitudinal axis coincident with that of the duct and two groups of conductors positioned on opposite surfaces of the inside of the tube. Each group of conductors comprises two bundles of conductors spaced apart along the tube wall, with the conductors parallel to the uniform virtual current, and each conductor of one bundle joined to different conductors of the other bundle by connecting conductors to form a single winding. The connecting conductors are so distributed over those other opposite interior surfaces of the tube which are adjacent to the said bundles that the two-dimensional magnetic field across the tube between the groups of conductors is preserved in the regions of the said other opposite interior surfaces.

Reverting now to calculating the best electrode shape for uniform weight function for any given magnetic field applied across a liquid filled tube, the following assumptions are made:

(i) Liquid velocity is everywhere parallel to the tube axis.
(ii) The tube is a cylinder of circular section.
(iii) The magnetic field and the electrodes have the highest possible symmetry.
(iv) The electrodes are set back from the liquid by a distance which may vary on moving around the tube but remains constant on moving parallel to the tube axis.

The method described below may, however, as will be apparent, be generalized to include cases where none of these assumptions are valid.

Vector algebra is used below where a vector is underlined thus "—", "." indicates a scalar product, and "x" indicates a vector product. The operator "∇" is also used.

The inter-electrode potential U is given by $$U = \int \underline{v} \cdot \underline{W} d\tau \qquad (1)$$

where $\underline{v}$ is the velocity of the liquid and the 'weight vector' $\underline{W}$ is given by $$\underline{W} = \underline{B} \times \underline{j} \qquad (2)$$

where $\underline{B}$ is the magnetic flux density and $\underline{j}$ is the virtual current. The integration in equation (1) is conducted over the entire volume of the liquid. Because of assumptions (i) and (ii) equation (1) reduces to $$U = \int_o^R \int_o^{2\pi} vWrd\theta dr \qquad (3)$$

where $$W = \int_{-\infty}^{\infty} (W)_z dz \qquad (4)$$

R is the tube radius and use is made of polar co-ordinates r, $\theta$ and z the z axis coinciding with the tube axis and the line $\theta = \pm(\pi/2)$, z=o passing through the center of the electrodes. W (which is the 'weight function') and v are generally functions of r and $\theta$. It is clear from equation (3) that when W=constant, U is proportional to flowrate. Hence when $\underline{B}$ is given, the electrode shape (which determines $\underline{j}$) can be adjusted to make W as constant as possible. The method of optimizing electrode shape consists of first calculating $\underline{j}$ and hence W for pairs of diametrically opposite contacting point electrodes and then approximating a large contactless electrode by an array of contacting point electrodes connected to a common rail by capacitances whose values can be adjusted to minimize the variation in W.

For a pair of contacting electrodes at r=R, $\theta = \pm(\pi/2)$, z=o the calculation of W is carried out as follows. First $\underline{j}$ is expressed as $$\underline{j} = -\nabla G$$

which is possible because $\nabla \times \underline{j} = 0$ and then G is found by solving $$\nabla^2 G = 0$$

(which is true because $\nabla \cdot \underline{j} = 0$) by a finite difference method bringing in suitable boundary conditions, the volume of liquid being divided up into a finite number of cells whose centers form a lattice with regular intervals in r, $\theta$ and z. The magnetic field is expressed as $\underline{B} = -\nabla F$ and F is calculated like G (for a given magnet geometry) and evaluated at the same lattice points. The component $W_z$ of $\underline{W}$ at the center of each cell is then calculated using equation (2). The values of W associated with lattice points on the plane z=o are then calculated using equation (4) approximating the integral by a sum over the lattice points lying on a line parallel to the z axis. These values are termed $W_{n1}$ the suffix n representing the $n^{th}$ lattice point on the plane z=o and the suffix 1 indicating that the electrodes are situated at $\theta = \pm(\pi/2)$.

By rotating the diameter joining the electrodes about the z axis through intervals of $\theta$ corresponding to the lattice intervals and by translating the diameter along lattice intervals in the z direction, it is possible to calculate the weight functions $W_{nm}$ for pairs of diametrically opposed contacting point electrodes at a variety of positions indicated by the suffix m. If electrode pairs are now imagined to exist at all these positions simultaneously and if they are connected via capacitors to a common rail we have an approximation to a contactless electrode the spacing s being related to the nearest capacitor $C_m$ by $$s = \text{const}/C_m$$

The weight function $W_n$ of the compound electrode system is a linear combination of the $W_{nm}$, i.e.

$$W_n = \Sigma_m \alpha_m W_{nm}$$

When unit current is passed through the compound electrode system the current $I_m$ flowing through capacitor $C_m$ is proportional to $C_m$ (for the purposes of this calculation resistive losses in the liquid are negligible) hence the $\alpha_m$ are also proportional to the $C_m$. Since only the ratios of the capacitance values determine the weight function the required capacitances or the spacing variable s is known when the values of $\alpha_m$ are known that make $W_n$ as constant as possible.

The best values of $\alpha_m$ are found by minimizing the expression $$\Sigma_n (W_n - 1)^2$$

where the sum is conducted over all the lattice points in the cross-section or over a set of those points (e.g. near the tube wall) where variations in $W_n$ are likely to be greatest. This is mathematically equivalent to solving the linear equations $$\Sigma_m \alpha_m (\Sigma_n W_{nm} W_{mn'}) = \Sigma_n W_{nm'}$$

which can be accomplished on a computer. In these equations m' may take on any value which m can take.

When this method is applied to the magnetic field produced by coils 10 and 11 in FIG. 1 the resulting electrode shape is as illustrated in the same figure. That is, on passing from an electrode center around the circumference of the tube, the space between the electrode and the liquid (i.e. the thickness of the insulating layer) increases at first only slowly then more rapidly giving a characteristic shape. The shape, however, would be different for another magnet configuration.

Certain embodiments of the invention will now be described by way of example with reference to the accompanying drawings in which.

Figure 1:
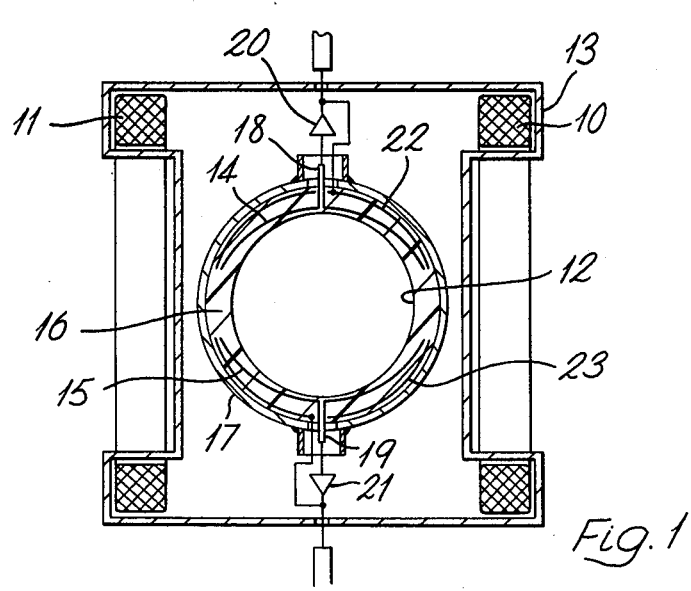
FIG. 1 is a cross-section of a flowmeter according to the invention in which the shape of the electrodes is determined to provide a substantially uniform weighting function for a given magnetic field.
Figure 3:
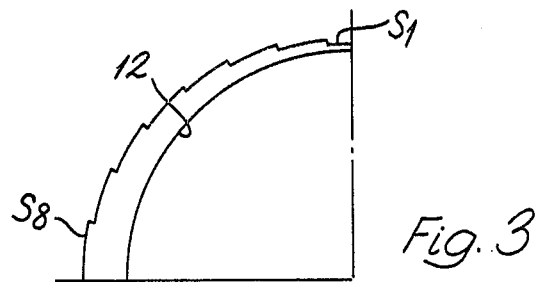
Figure 4:
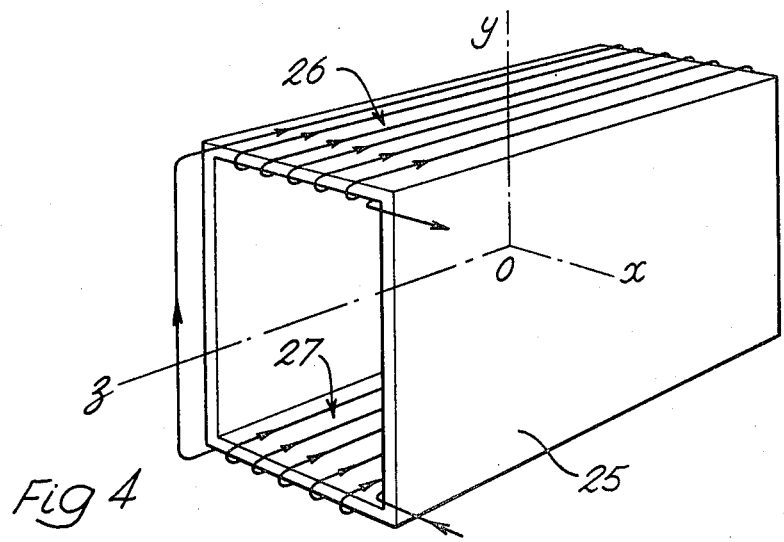
Figure 5:
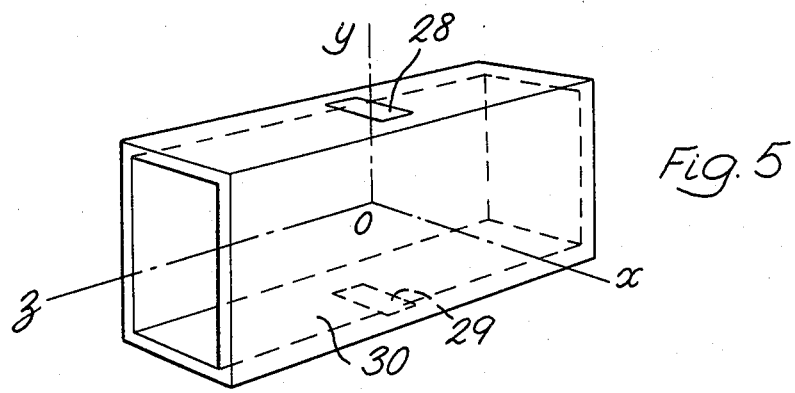
Figure 6:
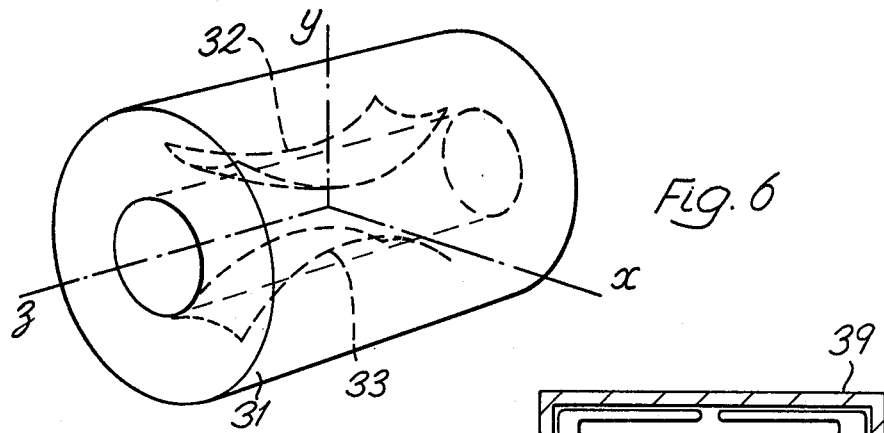
Figure 7:
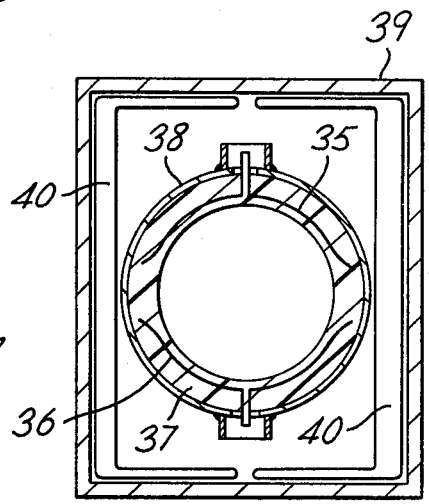
Figure 8:
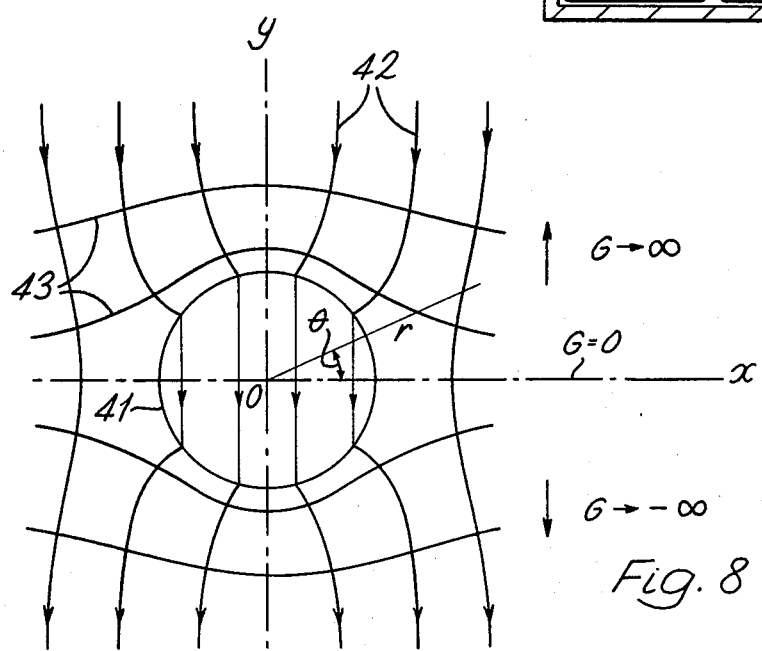
Figure 12:
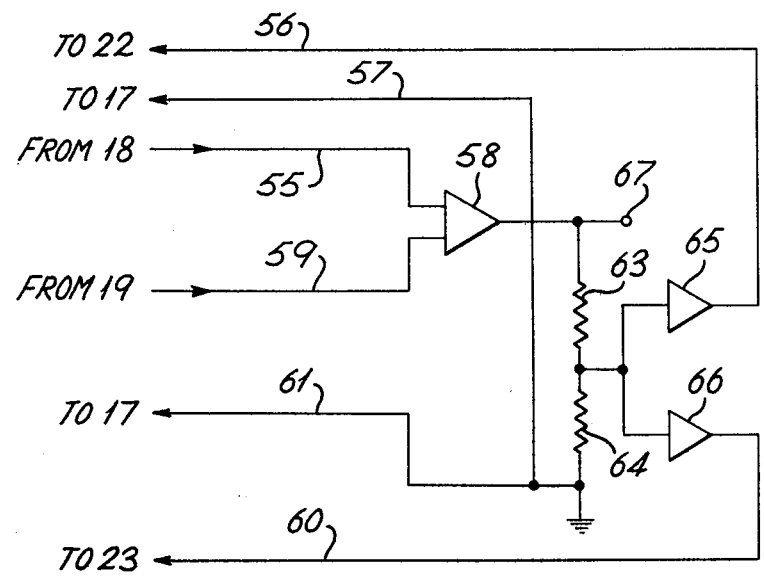

FIG. 3 illustrates different thicknesses of insulation derived in arriving at an electrode shape for the flowmeter of FIG. 1, FIG. 4 shows means for applying a uniform magnetic field in another flowmeter according to the invention, FIG. 5 shows an arrangement for use in deciding the shape of electrodes for use with the said other flowmeter, FIG. 6 shows electrodes for the said other flowmeter when a circular cross-section duct is used, FIG. 7 is a cross-section of a further flowmeter according to the invention employing a "two dimensional" magnetic field, FIG. 8 is a diagram used in explaining the electrode shape used in the flowmeter of FIG. 7, FIG. 9 is a diagram illustrating the layout of conductors for providing the magnetic field for the flowmeter of FIG. 7, FIG. 10 is a diagram used in explaining a distribution of conductors used in the flowmeter of FIG. 7, FIG. 11 is a plan view of the flowmeter of FIG. 7, FIG. 12 is a block diagram illustrating one way in which screens in the flowmeter of FIG. 1 may be connected.

An embodiment of the invention suitable for rectilinear flow is first described with reference to FIG. 1 in which plain rectangular coils 10 and 11 apply a magnetic field with the aid of a magnetic core 13 to liquid flowing in a stainless steel tube 17 having an insulating liner 16 formed from epoxy resin. Electrodes 14 and 15 are embedded in the liner 16 and are so spaced at a varying distance from the inner surface 12 of the liner 16 that a substantially uniform weighting exists in the pipe but since the arrangements for applying the magnetic field are simple and not designed to shape the field, uniform weighting is achieved only when the said spacing is correctly determined.

Figure 2:
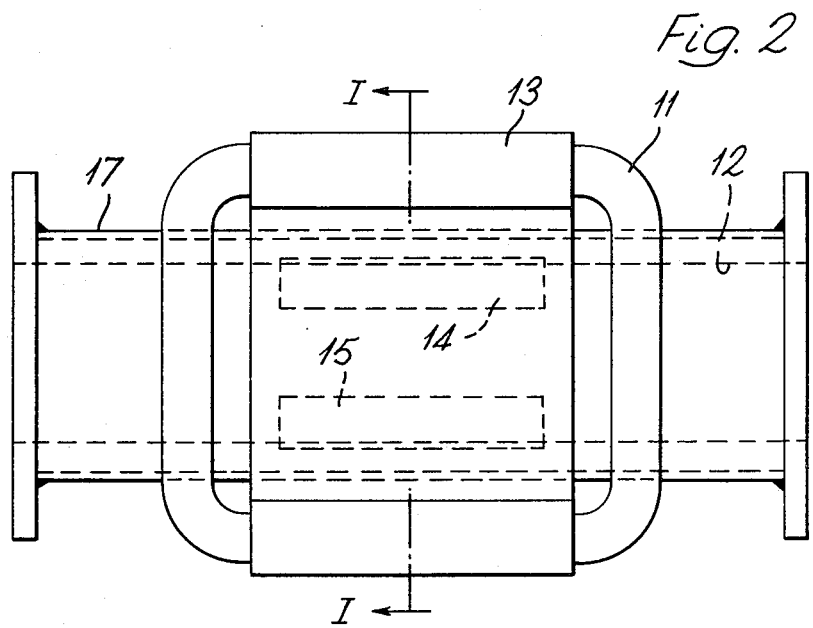
FIG. 2 is a side view of the flowmeter of FIG. 1.

As can be seen in the side view of FIG. 2 both the electrodes 14 and 15 and the magnetic core 13 are elongated in the longitudinal direction of the tube 17 but their shapes do not vary in this direction. Electrical connections to the electrodes 14 and 15 are made at terminals 18 and 19 and owing to the high (almost entirely capacitive) impedance of a contactless flowmeter pre-amplifiers 20 and 21 with very high input impedance are necessary. To avoid capacitive losses in cables these amplifiers are best fixed to the flow sensing head as near as possible to the electrodes as shown in FIG. 1.

The pre-amplifiers are preferably of unit gain and their outputs are connected to screens 22 and 23 (shown in FIG. 1 but not in FIG. 2) embedded in the liner 16 between the electrodes and the surrounding steel tube. This makes effectively infinite the impedance between an electrode and the steel pipe 17 thereby eliminating uncertainties in signal losses which would otherwise occur. The screens 22 and 23 extend to left and right of the vertical axis of FIG. 1 and the terminals 18 and 19 pass through small apertures in the screens. The voltage measured between the outputs of the amplifiers 20 and 21 is proportional to mean flow velocity for rectilinear flow and is substantially independent of velocity profile.

An alternative way of connecting the screens 22 and 23 is shown in FIG. 12 where the electrode 18 is connected by way of the inner conductor 55 of a double screened cable, having an inner screen 56 and an outer screen 57, to one input of a unity gain differential amplifier 58. The other input of the amplifier 58 is similarly connected by way of the inner conductor 59 of a double screened cable, having screens 60 and 61, to the electrode 19.

The output of the amplifier 58 is halved using a potentiometer formed by two equal resistors 63 and 64 and positively fed back by way of an amplifier 65 having a gain of +1 by way of the inner screen 56 to the screen 22. Similarly negative feed back is applied by way of an amplifier 66 having a gain of −1 by way of the inner screen 60 to the screen 23.

The outer screens 57 and 61 are connected to the pipe 17 and system earth. The output from the flowmeter, representative of mean fluid velocity is obtained from the output of the differential amplifier 58 at terminal 67.

In order to find the required shape for the electrodes 14 and 15, values of $\alpha_m$ are found minimizing the expression $$\Sigma_n(W_n-1)^2$$

given above, or by solving the linear equations $$\Sigma_m \alpha_m(\Sigma_n W_{nm} W_{nm'}) = \Sigma_n W_{nm'}$$

also given above.

In one example of this embodiment, each quadrant is divided into eight segments as shown for the top left quadrant shown in FIG. 3. Only the thickness of epoxy in the eight segments between the pipe wall and a theoretical version of the electrode 14 is shown. Each segment is one internal diameter of the liner 16 in axial length. A first segment $S_1$ subtends half the angle at the center which is subtended by the other segments, and the effect of eighth segment $S_8$ is ignored in calculations because the voltage induced therein is negligible. With a 3 inch (7.6 cm) internal liner diameter the thicknesses and corresponding capacitances shown in Table I are obtained when the epoxy used between the surface 12 and the electrodes 14 and 15 is Araldite CY 219 (permittivity $\epsilon r=6.3$). A different epoxy Araldite AY 103 (permittivity $\epsilon r=3$) was used between the electrodes 14 and 15 and the tube 17.

TABLE I

| | Segment | | | | | | |
|---|---|---|---|---|---|---|---|
| | $S_1$ | $S_2$ | $S_3$ | $S_4$ | $S_5$ | $S_6$ | $S_7$ |
| Radial epoxy thickness (mm) | 1.5 | 1.6 | 1.8 | 2.5 | 3.5 | 5.2 | 9.2 |
| Capacitance pF | 11.0 | 21.0 | 17.8 | 13.6 | 9.8 | 6.8 | 4.0 |

Thus a total capacity for each electrode 14 or 15 of 168 pF is obtained and at 50 Hz the input impedance of each electrode is about $1.9 \times 10^7$ Ohms. In practice it is inappropriate to make the stepped arrangement of FIG. 3, smooth electrodes as shown in FIG. 1 taking up the mean position of the steps of FIG. 3 are used.

Some embodiments of the invention which do not require rectilinear flow and which use a uniform magnetic field together with a "two-dimensional" virtual current are now described.

In FIG. 4 the aim is to provide a uniform magnetic field in the direction of the $\underline{x}$ axis within an open-ended rectangular tube 25. The tube 25 is of highly magnetically permeable steel and windings 26 and 27 are wound on opposite sides in directions such that the magnetic fluxes generated when current flows in the windings oppose one another in the tube walls. The conductors of the windings 26 and 27 are parallel to the $\underline{z}$ axis and wound uniformly with no gaps between them. The magnetic field produced within the tube is nearly uniform except near the open ends.

For a rectangular cross-section flowmeter an insulating tube 30 shown in FIG. 5 is positioned inside the tube 25 of FIG. 4. To obtain a two-dimensional virtual current, that is a current which has a zero component in the $\underline{x}$ direction, strip electrodes 28 and 29 are fixed externally to the tube 30. The centers of the electrodes 28 and 29 lie on the $\underline{y}$ axis and their sides are parallel to the $\underline{x}$ and $\underline{z}$ axes. The electrodes extend across a width equal to that of the inside surface of the tube in the $\underline{x}$ direction. The virtual current set up in the liquid in this configuration has no component in the $\underline{x}$ direction because the electrodes are uniform in the x direction and the virtual current is bounded by insulating surfaces perpendicular to the $\underline{x}$ axis.

For a flowmeter of circular cross-section an epoxy tube 31 shown in FIG. 6 and containing electrodes 32 and 33 is placed inside the tube 25 with the longitudinal axes of the two tubes coincident. The shapes of the electrodes 32 and 33 are obtained by first numerically calculating the value of the normal component of the virtual current at a large number of points on the interior surface of the cylinder 31 when notionally positioned inside the tube 25 of FIG. 4. Alternatively currents corresponding to these virtual current components can be measured at a large number of points at positions corresponding to the interior surface of the cylinder 31 of FIG. 6. The distance of the electrodes 32 and 33 at every one of the said points where virtual currents are measured is then made inversely proportional to the normal component of the virtual current at that point. Provided the electrodes are close enough to the inner cylindrical surface over most of their area, the same virtual current pattern will then be produced in the liquid as in the configuration in FIG. 5. The spacing of each electrode from the interior surface of the cylinder 31 increases on passing along or around the cylinder 31 away from the center of an electrode until the spacing is so great that the electrical coupling between the electrode and liquid is negligible. This means the electrodes can be terminated rather than infinitely extended.

A further embodiment of the invention is now described which again does not require rectilinear flow but which employs a "two-dimensional" magnetic field and a uniform virtual current. In FIG. 7 electrodes 35 and 36 are again held in place in an epoxy resin tube 37 inside a stainless steel tube 38. Screening electrodes and amplifiers similar to those shown in FIG. 1 are used in practice but omitted from FIG. 7 for simplicity. A magnetic field is applied inside a magnetic core in the form of a tube 39 by windings 40 which are described in more detail below.

The shape of the electrodes 35 and 36 for uniform virtual current is determined as follows. If a conducting cylinder 41 is placed in a dielectric medium with a uniform external sinusoidally alternating electric field perpendicular to the axis of the cylinder, then electric field lines 42 and surfaces of constant potential 43 are as illustrated in FIG. 8. Inside the cylinder the electric field and associated current density are uniform as is well known. When the conductivity of the cylinder is large compared with the product of the dielectric constant ($\epsilon$) of the medium and the angular frequency ($\omega$) of the field, the field lines and constant potential surfaces assume a shape independent of the conductivity of the cylinder. This condition is nearly always met in a flowmeter. For example for a tap water cylinder and epoxy medium with $\epsilon = 6\epsilon_o$, $\sigma/\epsilon\omega \approx 6 \times 10^5$ at 50 c/s.

The equation for a constant potential surface in the dielectric is then $$r = \frac{G}{2 \sin \theta} + \sqrt{\left[\frac{G}{2 \sin \theta}\right]^2 + R^2}$$

where G is the constant potential on the surface, R is the radius of the cylinder and r and $\theta$ are polar co-ordinates as shown in FIG. 8. The shapes of two of these constant potential surfaces for equal and opposite values of G are suitable shapes for the electrodes required for the arrangement of FIG. 7, the electrodes themselves being constant potential surfaces. The field set up between such electrodes when unit current flows into one and out of the other is identical to the field pictured in FIG. 8 and thus the required uniform virtual current is produced in the cylinder.

The two-dimensional magnetic field for the arrangement of FIG. 7 is applied by the windings 40 each of which has conductors of the form indicated by the dashed lines 45 in FIG. 9. For simplicity only one group of conductors corresponding to one winding 40 is indicated in FIG. 9 but another winding opposite that shown is, of course, used. The conductors 45 are fixed on the inside surface of the magnetic core which is in the shape of an open-ended rectangular tube 39 made from high permeability steel. Connections are made to the windings by means of conductors 46.

On the inner surface of the tube 39 parallel to the yz plane the conductors are straight and parallel to the y axis forming, in this example, two narrow bundles of wire. Thus if the y dimension c of the tube 39 is great enough the field produced inside the tube has components in the x and z directions but no component in the y direction. Since the dimension c has in practice to be limited it is necessary to consider the effect of the walls parallel to the xz plane. This effect is considerably reduced by strategically distributing the coil windings over the top and bottom walls. In this example the narrow bundles of wires on the side walls are divided into three equal narrow bundles on the top and bottom walls as indicated in FIG. 9. The shape of the required magnetic field lines 47 and lines of constant magnetic potential 48 (as would exist if c=∞) are illustrated in FIG. 10 and may be calculated using well known complex variable theory. The equation for a constant potential line of potential F is then:

$$x = b\left[1 - \frac{2}{\pi}\tan^{-1}\left(\frac{\alpha-\beta}{2\tan F} \pm \sqrt{\frac{(\alpha-\beta)^2}{4\tan^2 F} - \alpha\beta}\right)\right]$$

where
$\alpha = \tan h(\pi/2b)(z+a)$, b=half the x dimension of the tube 40,
$\beta = \tan h(\pi/2b)(z-a)$ and a=half the distance between the groups of conductors 45 on one side of the tube 40.

To preserve this field at points inside and near to the top and bottom walls of the tube 39 in FIG. 9 a current distribution must be present on the inside surface of those walls so that the current flow lines are identical to the lines of constant magnetic potential in FIG. 10 and the quantity of current flowing between two such lines is proportional to the difference in the values of F for those two lines. A good enough approximation, however, is obtained by dividing the conductors into three equal groups when they reach the top and bottom surfaces and positioning these three groups along lines of potential $5\pi/6$, $\pi/2$ and $\pi/6$ (i.e. midway between the constant potential lines of potential $\pi$, $2\pi/3$, $\pi/3$ and 0 which divide the total current into three equal parts). The resulting shapes of the three bundles are approximately as shown at 49, 50 and 51 in FIG. 11.

As in the flowmeter of FIGS. 1 and 2 and that of FIG. 7, the flowmeter described with reference to FIGS. 4, 5 and 6 preferably employs screens and amplifiers similar to those of FIG. 1. In all the embodiments shown the magnetic field is due to 50 Hz alternating current flowing in various coils and windings, and the velocity of the liquid is obtained by measuring the voltage between the electrodes, this voltage being substantially proportional to liquid velocity.

Now that several specific embodiments of the invention have been described it will be clear that many other forms of flowmeter construction fall within the scope of the invention.

We claim:

1. A flowmeter comprising
a duct for a fluid, the duct having a substantially circular cross-section,
means for applying a magnetic field to a fluid in the duct, the magnetic field having at least one component which is generally normal to the direction of fluid flow, and
two electrodes each having an appreciable area as compared with a point electrode and being insulated from fluid in the duct, the electrodes being positioned adjacent to the inner surface of the duct, opposite one another across the duct, to ensure that a virtual current between the electrodes would have at least a component generally normal to both the direction of fluid flow and the magnetic field, the distance between the longitudinal axis of the duct and each electrode increasing with increasing distance around the periphery of the inner surface of the duct from the center of the electrode in order to minimize the effect of fluid velocity profile in the duct on the voltage generated between the electrodes when fluid flows in the duct,
and the said voltage being representative of the mean velocity of fluid flowing through the duct.

2. A flowmeter according to claim 1 for use when flow through the duct is rectilinear, wherein
the means for applying a magnetic field comprises two rectangular windings one on one side of the duct and one on the other side, both windings having axes normal to the fluid flow, and
each electrode forming a segment of a conducting cylinder modified according to the said increase in distance of the electrode from the duct axis to ensure that flow in each portion of the duct cross-section contributes substantially uniformly to the said voltage representative of mean fluid velocity.

3. A flowmeter according to claim 1 wherein
the means for applying the magnetic field applies to a uniform magnetic field over a portion of the duct and the electrodes are shaped and positioned to ensure that a virtual current in the duct flowing between the electrodes would be two dimensional and would not have a component in the dimension parallel to the uniform magnetic field, the said increase in distance of the electrode from the duct axis at least contributing to the required nature of the virtual current.

4. A flowmeter according to claim 3 wherein
the means for applying a magnetic field comprises an open ended rectangular tube of magnetic material surrounding the duct and having a longitudinal axis which is substantially coincident with that of the duct, and
windings around opposite walls of the tube wound to provide opposing magnetic fluxes in the tube walls.

5. A flowmeter according to claim 4 wherein in each cross-section of the flowmeter normal to the duct axis the distance between each point on the interior surface of the duct and each electrode is inversely proportional to the normal component at that point of the required two dimensional virtual current in the duct.

6. A flowmeter according to claim 1 wherein
the electrodes are shaped and positioned to provide a uniform virtual current, the said increase in distance with increase in angle at least contributing to the required nature of the virtual current, and
the means for applying a magnetic field is constructed to apply a two-dimensional field to the duct with no component parallel to the uniform virtual current.

7. A flowmeter according to claim 6 wherein
the duct has a circular cross-section and
each electrode is shaped to conform with a constant potential surface in an imaginary arrangement in which the inner surface of the duct is replaced by a conducting cylinder placed in an initially uniform electric field normal to the cylinder axis.

8. A flowmeter according to claim 7 wherein
the means for applying the magnetic field comprises an open ended rectangular tube of magnetic material with longitudinal axis substantially coincident with that of the duct and two groups of conductors positioned on opposite surfaces of the inside of the tube, each group of conductors comprising two bundles of conductors spaced apart along the tube wall, with the conductors parallel to the uniform virtual current, and each conductor of one bundle joined to different conductors of the other bundle by connecting conductors to form a single winding, and the connecting conductors being so distributed over those other opposite interior surfaces of the tube which are adjacent to the said bundles that the two-dimensional magnetic field across the tube between the groups of conductors is preserved in the regions of the said other opposite interior surfaces.

9. A flowmeter according to claim 1 including
a respective screen for each electrode positioned adjacent to the electrode on that side thereof which is remote from the duct, and
a respective unity gain amplifier connected between each electrode and the screen for that electrode.

10. A flowmeter according to claim 1 including
a respective screen for each electrode positioned adjacent to the electrode on that side thereof which is remote from the duct,
a differential amplifier having respective inputs coupled to the electrodes and
means for applying a voltage equal to half the voltage between the said inputs to one of the said screens and
for applying a voltage equal to half the voltage between the said inputs, but of opposite polarity from the voltage between the said inputs to the other said screen.

11. A magnetic flowmeter for measuring the flow rate of a fluid conducted through a pipe having a longitudinal axis Z, the field intercepting a magnetic field having at least one component substantially parallel to a transverse axis X which is normal both to axis Z and a diametric axis Y, said flowmeter further comprising:

a pair of electrode assemblies mounted on the pipe on opposite sides of the Y axis in the region of the magnetic field; and
the voltage generated between the electrode assemblies being substantially proportional to flow rate and being substantially immune to the influence of a non-axisymmetric flow profile, said electrode assemblies being out of contact with the fluid and being capacitively coupled thereto to detect potential $\phi$ present on the fluid surface, the effective coupling capacitance of the assemblies so decreasing with increase in angle $\Psi = 90° - \theta$ with respect to the Y axis that the effect of fluid velocity profile in the pipe on the said voltage is minimized.

12. A flowmeter according to claim 11 for use where flow is substantially rectilinear wherein the lines of flux of the magnetic field are substantially normal to the Z axis, and
the said effective coupling capacitance of the said assemblies provides a weight function, representing the Z component of the vector product over the pipe cross section of magnetic field and virtual current between the said electrodes integrated along the Z axis, which is substantially constant.

13. A flowmeter according to claim 11 wherein
the magnetic flux is uniform and the lines of the magnetic field are essentially normal to the Y and Z axes,
and the said effective coupling capacitance is arranged to ensure that a virtual current in the pipe flowing between the electrode assemblies would be two dimensional and would not have a component in the direction of the X axis.

14. A flowmeter according to claim 11 wherein
the magnetic flux is two dimensional with no component in the direction of the Y axis, and
the said effective coupling capacitance of the assemblies decreases in a manner substantially proportional to the cosine of the said angle $\Psi = 90° - \theta$.

15. A flowmeter as set forth in claim 14, wherein said electrode assemblies are constituted by a pair of surface electrodes, each of which has a radial distance with reference to the Z axis which is smallest at the Y axis and increases with increasing angle $\Psi = 90° - \theta$ with respect to the Y axis.

16. A flowmeter as set forth in claim 11, wherein said electrode assemblies are constituted by a pair of surface electrodes, each of which has a radial distance with reference to the Z axis which is smallest at the Y axis and increases with increasing angle $\Psi = 90° - \theta$ with respect to the Y axis.

17. A magnetic flowmeter for measuring the flow rate of a fluid conducted through a pipe having a longitudinal axis Z, the fluid intercepting a magnetic field whose lines of flux are essentially parallel to a transverse axis X, which is normal both to axis Z and a diametric axis Y, said flowmeter further comprising:
A. a pair of electrode assemblies mounted on the pipe on opposite sides of the X axis in the region of the magnetic field; and
B. a converter whose input terminals are connected to the electrode assemblies to produce a signal which is proportional to flow rate and is substantially immune to the influence of a non-axisymmetric flow profile, said electrode assemblies being out of contact with the fluid and being capacitively coupled thereto to detect a potential present on the fluid surface, the effective coupling capacitance of the assemblies decreasing in a manner substantially proportional to the cosine of an angle defined with respect to the Y axis.

18. A flowmeter as set forth in claim 17, wherein said electrode assemblies are constituted by a pair of surface electrodes, each of which has a radial distance with reference to the Z axis which is smallest at the Y axis and increases with increasing angle defined with respect to the Y axis.

* * * * *